United States Patent

Bronshvatch et al.

[11] Patent Number: 5,805,384
[45] Date of Patent: Sep. 8, 1998

[54] ACTUATOR LATCH ACTIVATED BY HEAD GRAM LOAD FOR HARD DISC DRIVES

[75] Inventors: Efim Bronshvatch; Ron Fasano, both of Saratoga; Ming-Goei Sheu, Cupertino, all of Calif.

[73] Assignee: Seagate Technology, Inc., Scotts Valley, Calif.

[21] Appl. No.: 871,140

[22] Filed: Jun. 9, 1997

Related U.S. Application Data

[60] Provisional application No. 60/036,126, Jan. 21, 1997 and provisional application No. 60/040,030 Mar. 4, 1997.

[51] Int. Cl.⁶ .............................. G11B 5/54; G11B 21/22
[52] U.S. Cl. .............................................................. 360/105
[58] Field of Search .............................................. 360/105

[56] References Cited

U.S. PATENT DOCUMENTS

| | | | |
|---|---|---|---|
| 4,647,997 | 3/1987 | Westwood et al. | 360/105 |
| 5,170,300 | 12/1992 | Stefansky | 360/105 |
| 5,208,713 | 5/1993 | Lindsay et al. | 360/105 |
| 5,231,556 | 7/1993 | Blanks | 360/105 |
| 5,261,912 | 11/1993 | Hudson et al. | 360/105 |
| 5,313,354 | 5/1994 | Sampietro et al. | 360/105 |
| 5,361,182 | 11/1994 | Sampietro | 360/105 |
| 5,365,389 | 11/1994 | Jabbari et al. | 360/105 |
| 5,369,538 | 11/1994 | Moe et al. | 360/106 |
| 5,555,146 | 9/1996 | Hickox et al. | 360/105 |
| 5,581,424 | 12/1996 | Dunfield et al. | 360/105 |
| 5,612,842 | 3/1997 | Hickox et al. | 360/105 |

*Primary Examiner*—John H. Wolff
*Attorney, Agent, or Firm*—Edward P. Heller, III; Raghunath S. Minisandram

[57] ABSTRACT

A latching mechanism for a disc drive actuator that makes use of a constant force to hold the latch in an unlatched position while the disc drive is in operational mode. The latching mechanism uses the power of the actuator to move the latching mechanism into a latched position under program control or upon the detection of a power loss. While in the latched position, the configuration of the latching mechanism components combined with the frictional contact between heads and discs serves to overcome the constant force and maintain the actuator in its park position, even in the presence of applied mechanical shock, until power is restored to the disc drive. Unlatching of the latching mechanism is accomplished by bringing the spindle motor up to a speed at which the heads begin to fly, eliminating the friction between the heads and discs and allowing the constant force to move the latching mechanism to it unlocked position. The latch mechanism includes features which move the actuator from its park position as the latching mechanism is disengaged. Various mechanisms for providing the constant force to the latch body are disclosed.

4 Claims, 5 Drawing Sheets

ACTUATOR LATCH ACTIVATED BY HEAD GRAM LOAD FOR HARD DISC DRIVES

CROSS REFERENCE TO RELATED APPLICATIONS

This application claims the benefit of United States Provisional Application Numbers 60/036,126, filed Jan. 21, 1997 and 60/040,030, filed Mar. 4, 1997.

FIELD OF THE INVENTION

This invention relates generally to the field of hard disc drive data storage devices, and more particularly, but not by way of limitation, to an improved actuator latching mechanism for holding the actuator mechanism of the disc drive at a park position in the absence of power.

BACKGROUND OF THE INVENTION

Disc drives of the type known as "Winchester" disc drives, or hard disc drives, are well known in the industry. Such disc drives magnetically record digital data on a plurality of circular, concentric data tracks on the surfaces of one or more rigid discs. The discs are typically mounted for rotation on the hub of a brushless DC spindle motor. In disc drives of the current generation, the spindle motor rotates the discs at speeds of up to 10,000 RPM.

Data are recorded to and retrieved from the discs by an array of vertically aligned read/write head assemblies, or heads, which are controllably moved from track to track by an actuator assembly. The read/write head assemblies typically consist of an electromagnetic transducer carried on an air bearing slider. This slider acts in a cooperative hydrodynamic relationship with a thin layer of air dragged along by the spinning discs to fly the head assembly in a closely spaced relationship to the disc surface. In order to maintain the proper flying relationship between the head assemblies and the discs, the head assemblies are attached to and supported by head suspensions or flexures.

The actuator assembly used to move the heads from track to track has assumed many forms historically, with most disc drives of the current generation incorporating an actuator of the type referred to as a rotary voice coil actuator. A typical rotary voice coil actuator consists of a pivot shaft fixedly attached to the disc drive housing base member closely adjacent the outer diameter of the discs. The pivot shaft is mounted such that its central axis is normal to the plane of rotation of the discs. An actuator bearing housing is mounted to the pivot shaft by an arrangement of precision ball bearing assemblies, and supports a flat coil which is suspended in the magnetic field of an array of permanent magnets, which are fixedly mounted to the disc drive housing base member. On the side of the actuator bearing housing opposite to the coil, the actuator bearing housing also typically includes a plurality of vertically aligned, radially extending actuator head mounting arms, to which the head suspensions mentioned above are mounted. When controlled DC current is applied to the coil, a magnetic field is formed surrounding the coil which interacts with the magnetic field of the permanent magnets to rotate the actuator bearing housing, with the attached head suspensions and head assemblies, in accordance with the well-known Lorentz relationship. As the actuator bearing housing rotates, the heads are moved radially across the data tracks along an arcuate path.

The movement of the heads across the disc surfaces in disc drives utilizing voice coil actuator systems is typically under the control of closed loop servo systems. In a closed loop servo system, specific data patterns used to define the location of the heads relative to the disc surface are prerecorded on the discs during the disc drive manufacturing process. The servo system reads the previously recorded servo information from the servo portion of the discs, compares the actual position of the actuator over the disc surface to a desired position and generates a position error signal (PES) reflective of the difference between the actual and desired positions. The servo system then generates a position correction signal which is used to select the polarity and amplitude of current applied to the coil of the voice coil actuator to bring the actuator to the desired position. When the actuator is at the desired position, no PES is generated, and no current is applied to the coil. Any subsequent tendency of the actuator to move from the desired position is countered by the detection of a position error, and the generation of the appropriate position correction signal to the coil.

When power to the disc drive is lost, servo control of the current flow in the coil of the voice coil actuator is lost. In the absence of DC current flowing in the coil, the actuator is free to move in response to such things as mechanical shock, air movement within the disc drive or mechanical bias applied to the actuator by the printed circuit cable (pcc) used to carry signals to the coil and to and from the heads mounted on the actuator. Since a power loss also means that the spindle motor will also cease to rotate the discs, the air bearing supporting the heads also begins to deteriorate and contact will be made between the heads and the discs. Because of this, it is common practice in the industry to monitor input power to the disc drive, and, at the detection of power loss, to drive the actuator to a park position and latch it there until power to the disc drive is restored.

It is also well known to use the back electromotive force (BEMF) generated by the inertia of the spinning discs to generate the power to move the actuator to a park position, and the park position is typically selected to be at a location which places the heads closely adjacent the hub of the spindle motor. By parking the heads toward the inner diameter of the discs, the amount of power necessary to overcome the frictional drag of the heads on the discs at power-up is minimized.

The principal requirements of an actuator latch mechanism are that it hold the actuator at the park position in the presence of a defined maximum specified amount of mechanical shock during the time interval when power is not applied, and that the latching mechanism be capable of releasing the actuator once power has been reapplied to the disc drive and the spindle motor brought back up to operational speed. It is also desirable if the latching mechanism can be implemented with a minimal cost, both in mechanical and electronic components.

Many forms of latches to hold the actuator at the park position have been used and are disclosed in the art. These include magnetic latches, solenoid-activated latches, shape-memory metal latches and aerodynamically activated latches. For a representative review of several prior art actuator latches, the reader is directed to U.S. Pat. No. 5,612,842, issued Mar. 18, 1997, U.S. Pat. No. 5,581,424, issued Dec. 3, 1996, U.S. Pat. No. 5,555,146, issued Sep. 10, 1996, U.S. Pat. No. 5,365,389, issued Dec. 15, 1994, U.S. Pat. No. 5,361,182, issued Dec. 1, 1994, U.S. Pat. No. 5,313,354, issued May 17, 1994, U.S. Pat. No. 5,262,912, Dec. 16, 1993 and U.S. Pat. No. 5,231,556, issued Jul. 27, 1993, all assigned to the assignee of the present invention and all incorporated herein by reference.

Many prior art actuator latches required the use of additional electronics and control logic to initiate either their latching or unlatching function, or both. Several prior art magnetic latch mechanisms have been rather unsatisfactory compromises between providing a magnetic latching force large enough to hold the actuator against mechanical shock, yet small enough to be overcome by the actuator at power-up.

Clearly a need exists for a simple latch mechanism for the actuator in a disc drive which does not require expensive electronic control circuitry, and which holds the actuator with sufficient force to withstand the maximum specified mechanical shock and which is easily released when power to the disc drive is restored.

SUMMARY OF THE INVENTION

The present invention is a latching mechanism for a disc drive actuator that makes use of a constant force to hold the latch in an unlatched position while the disc drive is in operational mode. The latching mechanism uses the power of the actuator to move the latching mechanism into a latched position under program control or upon the detection of a power loss. While in the latched position, the configuration of the latching mechanism components combined with the frictional contact between heads and discs serves to overcome the constant force and maintain the actuator in its park position, even in the presence of applied mechanical shock, until power is restored to the disc drive. Unlatching of the latching mechanism is accomplished by bringing the spindle motor up to a speed at which the heads begin to fly, eliminating the friction between the heads and discs and allowing the constant force to move the latching mechanism to it unlocked position. The latch mechanism includes features which move the actuator from its park position as the latching mechanism is disengaged.

It is an object of the invention to provide a latching mechanism to hold the actuator of a disc drive at a park position.

It is another object of the invention to provide a latching mechanism which requires no electronic or electrical controls for latching or unlatching.

It is another object of the invention to provide a latching mechanism that engages under influence of the actuator power source and disengages under influence of a constantly applied force.

These and other objects, features and advantages of the present invention can best be understood by a review of the following Detailed Description of the Invention, when read in conjunction with an examination of the accompanying drawings.

DETAILED DESCRIPTION OF THE INVENTION

Figure 1:
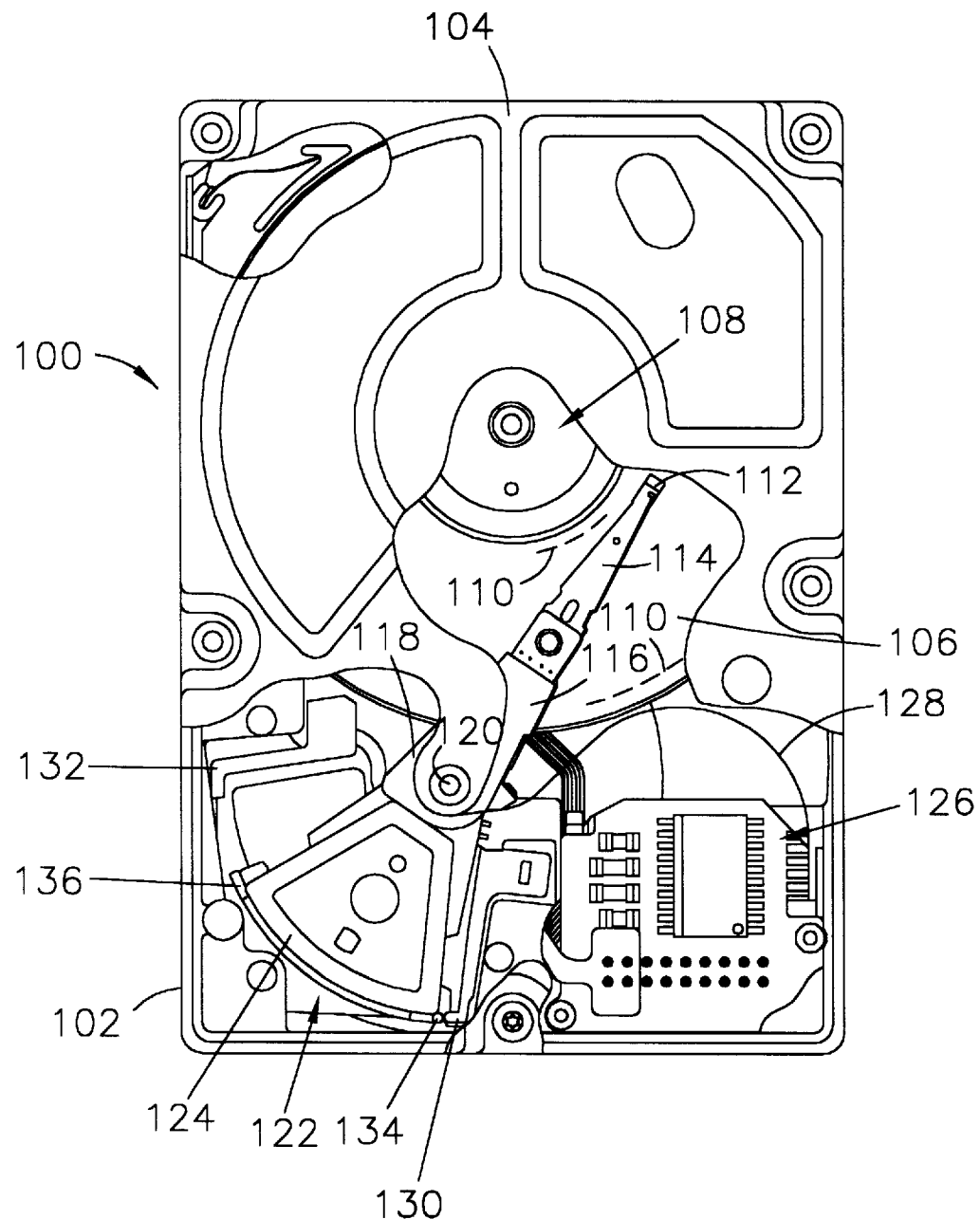
FIG. 1 is a plan view in partial cutaway of a disc drive in which the present invention is particularly useful.

Turning now to the drawings and specifically to FIG. 1, shown is a plan view of a disc drive 100 in which the present invention is particularly useful. The disc drive 100 includes a base member 102 to which all other components are directly or indirectly mounted and a top cover 104 (shown in partial cutaway) which, together with the base member 102, forms a disc drive housing which encloses delicate internal components and isolates these components from external contaminants.

The disc drive includes a plurality of discs 106 which are mounted for rotation on a spindle motor shown generally at 108. The discs 106 include on their surfaces a plurality of circular, concentric data tracks, the innermost and outermost of which are shown by dashed lines at 110, on which data are recorded via an array of vertically aligned head assemblies (one of which is shown at 112). The head assemblies 112 are supported by head suspensions, or flexures 114, which are attached to actuator head mounting arms 116. The actuator head mounting arms 116 are integral to an actuator bearing housing 118 which is mounted via an array of ball bearing assemblies (not designated) for rotation about a pivot shaft 120.

Power to drive the actuator bearing housing 118 in its rotation about the pivot shaft 120 is provided by a voice coil motor (VCM) shown generally at 122. The VCM 122 consists of a coil 124 which is supported by the actuator bearing housing 118 within the magnetic field of an array of permanent magnets (not separately designated) which are fixedly mounted to the base member 102, all in a manner well known in the industry. Electronic circuitry (partially shown at 126, generally, and partially carried on a printed circuit board (not shown)) to control all aspects of the operation of the disc drive 100 is provided, with control signals to drive the VCM 122, as well as data signals to and from the heads 112, carried between the electronic circuitry and the moving actuator assembly via a flexible printed circuit cable (PCC) 128.

The disc drive 100 also includes an arrangement of components for limiting the range of motion of the actuator. Specifically, the disc drive includes an inner limit stop 130 and an outer limit stop 132. The inner and outer limit stops 130, 132 cooperate with contact features 134, 136, respectively, integral to the coil 124 to define the innermost and outermost extent to which the actuator mechanism can move the heads 112.

The specific arrangement of limit stops 130, 132 and contact features 134, 136 shown in FIG. 1 is discussed in detail in previously incorporated U.S. Pat. No. 5,262,912, and will not be discussed herein in detail, except as it exemplifies certain characteristics of typical prior art magnetic latching mechanisms.

Typical prior art magnetic latching mechanisms, such as those described in U.S. Pat. Nos. 5,187,627, 5,262,912 and U.S. Pat. No. 5,361,182, include some source of magnetism and a magnetically permeable feature which is engaged by the permanent magnet to hold the actuator in its latched or park position. These prior art magnetic latches, in order to minimize the moving mass of the actuator and thus improve access speeds, mount a permanent magnet in a fixed location relative to the actuator and mount a magnetically permeable feature of low mass on the moving portion of the actuator. The latching mechanism is activated when the actuator moves the magnetically permeable feature on the moving actuator into proximity to the fixed permanent magnet. The magnet then draws the magnetically permeable feature— and thus the entire moving portion of the actuator—into contact and holds the actuator at its park position.

In these typical magnetic prior art latching mechanisms, unlatching the actuator becomes a significant design challenge. Firstly, the magnet attraction between the latch mechanism components must be great enough to hold the actuator in its latched condition even in the presence of applied mechanical shocks. As disc drives have historically become smaller and smaller, and been incorporated into portable and laptop computer systems, the amount of mechanical shock that the disc drive is expected to be able to withstand has also increased greatly, to the point where disc drives of the present generation are specified to withstand non-operational shock in the range of 350 G or greater, applied in any direction. Clearly, in order to maintain latching under such circumstances, the magnetic force used to hold the actuator must be relatively large, even when the moving portion of the actuator is as carefully balanced relative to its axis of rotation as is practicable. However, having a large magnetic attraction has its drawbacks: 1) since the magnetic attraction varies with the square of the distance separating the magnetic components, as the actuator approaches the latch position, the magnetic attraction of the latch components tries to pull the actuator to the latch position. This is not a problem if latching is being attempted. However to maximize the capacity of the disc drive, it is desirable to utilize as much of the disc surface as possible, including that portion of the disc close to the latch position. In disc drives incorporating prior art magnetic latching mechanisms, as the actuator moves to locations closer to the park position, the magnetic components of the latch exert an increasingly larger force which must be overcome by the servo system of the disc drive. This places constraints on the disc drive design which limit how much of the disc surface near the park position can be used for recording; and 2) once the prior art magnetic latches are engaged, a relatively large amount of power is required to separate the magnetic components from contact. When the actuator voice coil motor is used to pull the magnetic components apart, the resultant movement is typically a sudden rapid acceleration of the actuator away from the park position before the servo system can gain control of the actuator movement.

Prior art magnetic latching mechanisms have attempted to overcome these disadvantages by closely controlling the amount of magnetic latching force to provide an optimum balance between the minimum amount of force needed to hold the actuator at its latched position and the minimum amount of power needed to unlatch the mechanism, clearly opposing goals.

One prior art solution to these conflicting requirements is provided in previously incorporated U.S. Pat. 5,361,182, issued Nov. 1, 1994, in which the magnet force used for latching is maximized to ensure mechanical shock tolerance, and unlatching is assisted by the inclusion of a bucking coil which produces an electromagnetic force counter to the force of the permanent magnet during unlatching operation. While this solution is operable, it requires the inclusion of additional mechanical and electronic components, and thus adds to the complexity and cost of the disc drive.

It is known in the industry that the heads (112 in FIG. 1) will begin to fly when the spindle motor (108 in FIG. 1) has accelerated the rotation of the discs (106 in FIG. 1) to a particular speed, for instance X rpm, where X is determined by the specifics of the heads, discs, flexures and other known variables. It is typically an objective of disc drive designers to accelerate the discs to this minimum head-flying speed as quickly as possible to minimize the frictional wear between the heads and discs.

It is also known that the heads will cease to fly at a certain point during the deceleration of the discs when power is removed from the disc drive, for instance at Y rpm. Again, the value of Y is determined by the various components of the disc drive, and the time between when the discs decelerate to Y rpm and the time when the discs come to a complete stop is usually kept to a minimum to minimize friction-induced wear on the heads and discs.

The present invention provides a bistable latching mechanism which is held in its first, or unlatched, position by application of a constant force provided by, for instance, a permanent magnet. Latching is accomplished by using the power of the actuator voice coil motor to overcome the constant force and move the latching components to their latched position. The actuator voice coil motor holds the actuator at the latched position until the discs decelerate to the point where the heads cease to fly. The combination of the frictional force between the heads and discs, combined with selected geometric relationships between the latching components, is sufficient to maintain the actuator in its latched position in the presence of specified applied mechanical shocks.

Unlatching of the latching mechanism of the present invention is accomplished by bringing the discs up to the speed where the heads begin to fly, removing the frictional resistance to movement between the heads and discs. A small application of force from the actuator voice coil motor is momentarily applied to the latching mechanism components to overcome any stiction or resistance to movement in the latching components, at which time the constantly applied unlatching force is used to move the latch to its unlatched position. Certain features on the latching components are provided which, when the latching components move to their unlatched position, contact the moving portion of the actuator and move the actuator away from its park position. Details of the components of the latching mechanism of the present invention are shown in the figures and will be discussed in detail below.

Figure 2:
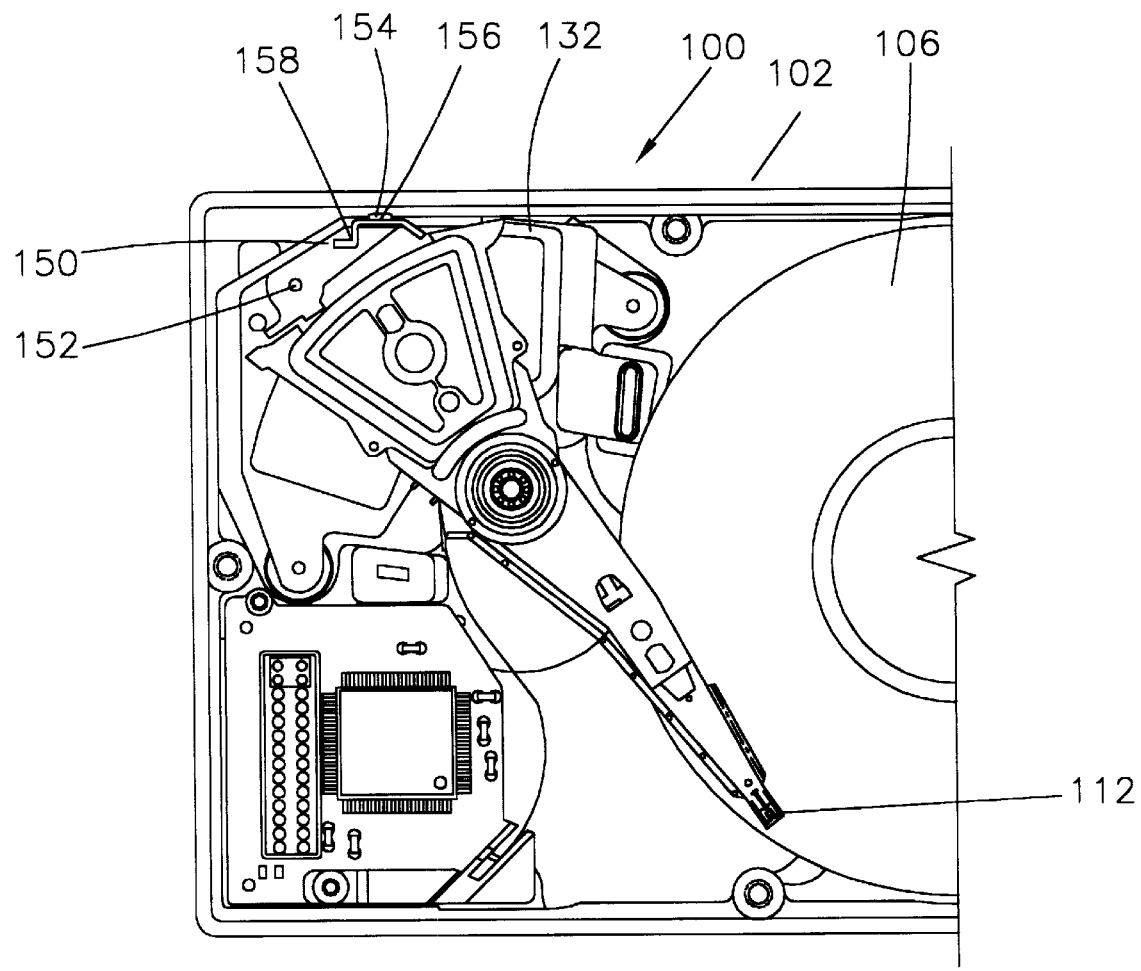
FIG. 2 is a partial plan view of a disc drive with the components of the latching mechanism of the present invention shown in their unlatched operational position.

FIG. 2 shows a partial plan view of a portion of a disc drive 100, such as that of FIG. 1, which includes a latching mechanism manufactured in accordance with the present invention. FIG. 2 is useful for a discussion of the overall component relationships in the disc drive, while details of the components of the latching mechanism of the present invention are best studied in FIG. 4, which is a detail view of the latching mechanism portion of FIG. 2.

The disc drive 100 still includes an outer limit stop 132 for defining the outward extreme of the range of actuator movement, as previously noted, and as described in detail in previously incorporated U.S. Pat. No. 5,262.912. The mechanism used to define the inner extreme of actuator motion is presently envisioned as incorporated in features of the latching mechanism, and will be discussed in detail below.

Figure 4:
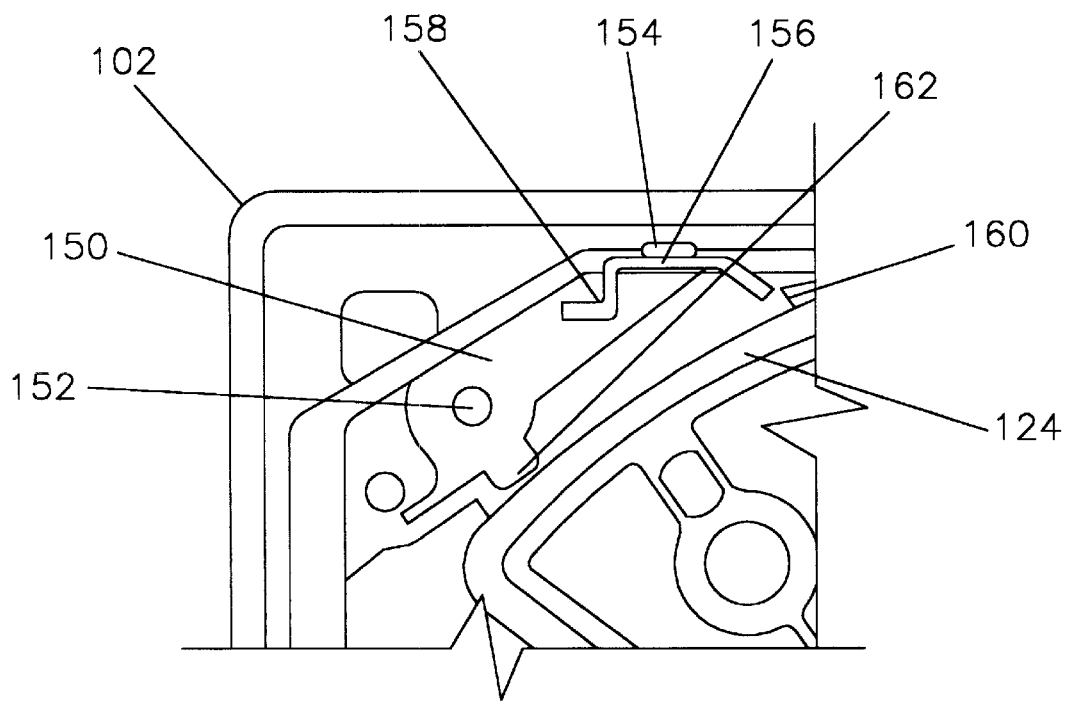
FIG. 4 is a detail view of the latch mechanism portion of FIG. 2.

FIG. 2 and FIG. 4 also show a latch body 150 mounted to rotate about a latch pivot pin 152. The latch body is shown in its unlatched position, allowing the actuator to move freely between the outer limit stop 132 and its intended innermost operational position. The latch body 150 is held in this unlatched position by magnetic attraction between a permanent magnet 154 fixedly mounted to the disc drive base member 102 and a striker portion 156 of a magnetically permeable pawl 158 integral to the latch body 150. From the figure, it is apparent that the permanent magnet 154 exerts a constant force on the pawl 158, attempting to maintain the latch body 150 in the unlatch position shown.

Figure 3:
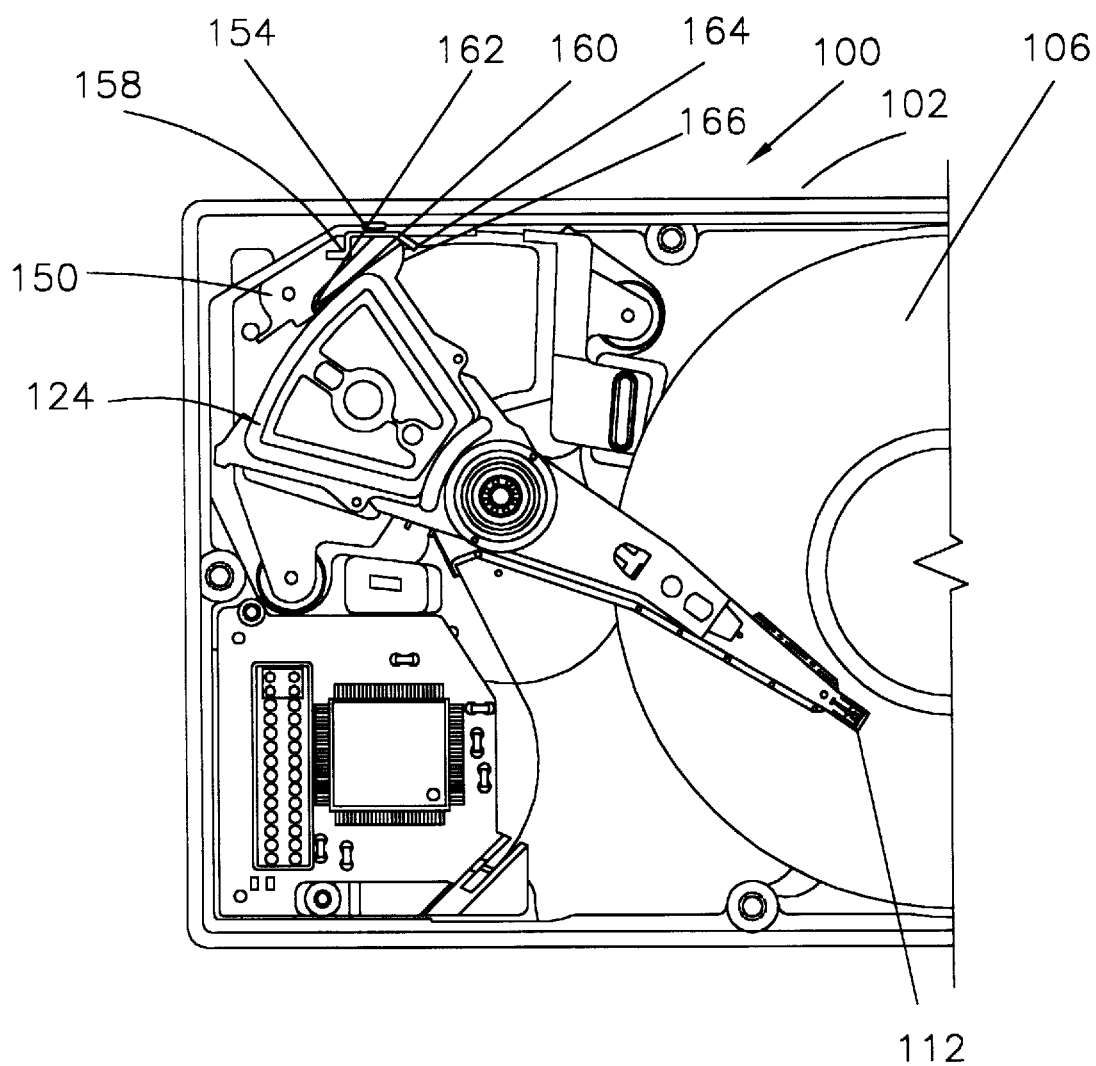
FIG. 3 is a partial plan view of a disc drive with the components of the latching mechanism of the present invention shown in their latched position.
Figure 5:
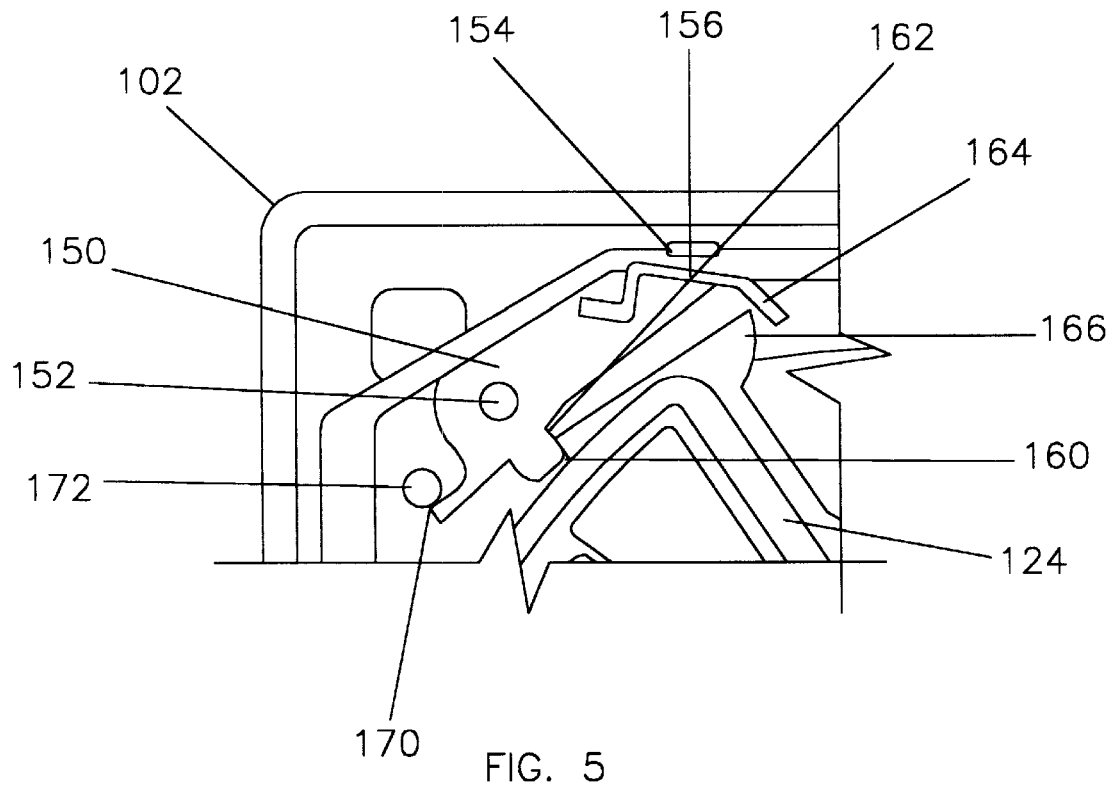
FIG. 5 is a detail view of the latch mechanism portion of FIG. 3.

FIG. 3 and FIG. 5 show a plan views of a disc drive 100 similar to that of FIG. 2 and FIG. 4, respectively, but with the actuator and latch body 150 in their latched positions. A comparison of FIG. 2 and FIG. 4 to FIG. 3 and FIG. 5 reveals that latching of the actuator is accomplished by rotating the actuator in a counterclockwise direction until the actuator reaches a park position with the heads 112 located near the inner diameter of the discs 106. When the actuator is rotated to the park position, as shown in FIG. 3 and FIG. 5, a first actuator latch contact feature 160 carried on the coil 124 of the actuator contacts a first latch body contact feature 162, overcoming the magnetic attraction between the permanent magnet 154 and the striker portion 156 of the pawl 158, and causing the latch body 150 to rotate clockwise about the latch pivot pin 152 to its latched position. Once the latch body 150 is in its latched position, as shown, a second latch body contact feature 164, which in the embodiment shown is a portion of the latch pawl 158, engages a second actuator latch contact feature 166, capturing the actuator at its park position. That is, the actuator is constrained by contact between the first actuator contact latch feature 160 and the first latch body contact feature 162 and by contact between the second actuator latch contact feature 166 and the second latch body contact feature 164.

During operation of the disc drive 100, power to move the actuator to the park position is provided by the actuator voice coil motor, and occurs as a result of either a park command issued by a host computer system to the disc drive or as a result of the detection of power loss. If the parking of the actuator is performed in response to a park command from a host computer system, one of skill in the art will realize that adequate energy can be provided by the normal actuator voice coil motor drive circuitry to accomplish the parking and latching of the actuator. Similarly, one of skill in the art will recognize that, during parking of the actuator due to detection of a power loss, the back end of the decelerating spindle motor can be used to generate current for application to the coil 124 of the voice coil motor to move the actuator to the park position, as is well known in the art.

Force from the voice coil motor is used to hold the actuator in the park position and the latch body 150 in the latched position until such time as the spindle motor slows to a speed inadequate to fly the heads 112 above the discs 106. Once the discs 106 have slowed and the heads 112 have come to rest in contact with the discs 106, friction between the heads 112 and the discs 106 is sufficient to hold the latch body 150 in the latch position against the tendency of the permanent magnet 154 to rotate the latch body 150 counterclockwise to its unlatched position. That is, the frictional force between the heads 112 and the discs 106 is greater than the magnetic force exerted on the latch pawl 158 by the permanent magnet 154.

The present invention thus overcomes the first of the disadvantages cited above in relationship to prior art magnetic actuator latches, i.e., there is no magnetic bias applied to the actuator when the actuator closely approaches the park position, because the force of the permanent magnet 154 is used only hold the latch body 150 in its unlatched position. Thus the disc drive can utilize that portion of the disc close to the park position without introducing a bias to the servo system that increases with proximity to the park position.

Referring again to FIGS. 2, 3, 4 and 5, unlatching of the actuator is accomplished by first accelerating the spindle motor. While the spindle motor is accelerating, but before the heads begin to fly, the friction between the heads 112 and discs 106 is reduced, and any tendency of the permanent magnet 154 to pull the latch body 150 to its unlatched position is countered by applying a current to the coil 124 of the voice coil motor to hold the actuator in its park position.

As the spindle motor continues to accelerate, it eventually reaches the speed at which the heads 112 begin to fly, and at this point the friction between the heads 112 and discs 106 is eliminated. A short-duration current pulse is applied to the coil 124 of the voice coil motor to "bump" the latch body 150, and break any stiction between the pivot shaft 152 and the latch body 150, and the permanent magnet 154 is then allowed to pull the latch body 150 to its unlatched position with the striker portion 156 of the latch pawl 158 engaging the permanent magnet 154.

While the latch body 150 is rotating from its latched to its unlatched position, contact between the first actuator contact feature 160 and the first latch body contact feature 162 will cause the actuator to be gently moved from its park position into the innermost usable area of the disc surface. That is, the magnetic force of the permanent magnet 154 is used to move the heads 112 away from their park position, at which time the actuator is freed to perform all normal seeking operations.

It is apparent from the above that the latching mechanism of the present invention thus overcomes the second of the cited drawbacks of typical prior art magnetic latches, i.e., there is no magnetic attraction in the latch that must be overcome to unlatch the actuator, so it is unnecessary to apply a large unlatching force to the coil 124 of the actuator voice coil motor, and risk a sudden uncontrolled acceleration of the actuator away from the park position.

As mentioned above, the extremes of range of motion of the actuator are controlled by limit stop mechanisms, and the limit stop 132 utilized to limit actuator motion toward the outer diameter of the disc is presently envisioned to be of the type described in previously incorporated U.S. Pat. No. 5,262,912. Definition of the inward extreme of actuator motion is presently envisioned as another functional aspect of the latching mechanism of the present invention. Looking in particular at FIG. 3 and FIG. 5, which, it will be recalled, show the actuator and latch body 150 in their latched positions, the latch body 150 can be seen to include a limit contact feature 170. This limit contact feature 170 bears against a limit pin 172, which is fixedly mounted to or an integral part of the disc drive housing base member 102. Thus, when the actuator moves to the park position and rotates the latch body 150 to its latched position, the contact from the first actuator contact feature 160 through the first latch body contact feature 162 to the limit contact feature 170 and finally the limit pin 172 provides a limit on the inward motion of the actuator which is characterized only by the materials of the named components.

The effectiveness of the latching mechanism in maintaining the actuator in a latched condition in the presence of applied mechanical shock can be appreciated by a further examination of FIG. 3. Any shock load applied to the disc drive 100 which would tend to unlock the actuator would tend to rotate the actuator in a clockwise direction. It will be noticed, however, that if the actuator attempts to move clockwise, the second actuator contact feature 166 will bear against the second latch body contact feature 164 in a direction which is substantially at a right angle to the only possible direction in which the latch body 150 can move, i.e., rotation about the pivot pin 152. Conversely, any shock applied in a direction which tends to rotate the latch body 150 will not be in a direction which would move the actuator away from its park position. Therefore, the latching mechanism of the present invention can be seen to be extremely effective in preventing the unlatching of the actuator due to applied mechanical shocks.

In the discussion above, the constant force applied to the actuator body to maintain the latch body in its unlatched position is provided by a permanent magnet 154, and the magnetic attraction of the striker portion 156 of the latch pawl 158. It would be evident to one of skill in the art that this constant force could be provided by other inexpensive components, such as a leaf spring, whisker spring or coil spring. Use of a spring force would eliminate the need for magnetically permeable components integral to the latch body 150, which could then be entirely molded from plastic.

Figure 6:
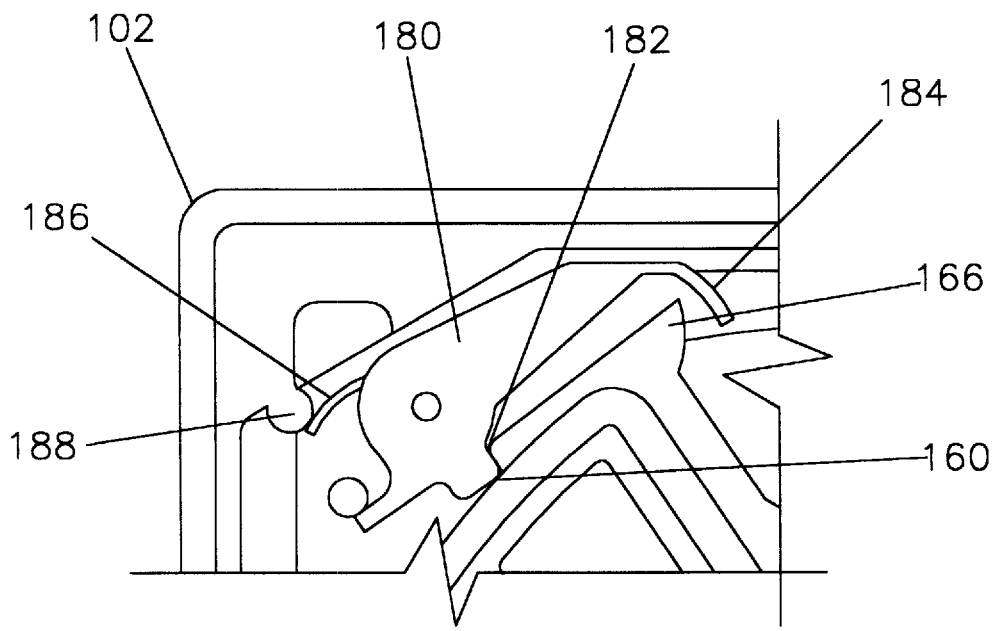
FIG. 6 is a detail view, similar to FIG. 5, showing a first alternative embodiment of the latching mechanism of the present invention.

FIG. 6 shows a first alternative embodiment of the latching mechanism of the present invention. In FIG. 6, it can be seen that the latch body 180 still includes a first latch body contact feature 182 and a second latch body contact feature 184, and that these latch body contact features 182, 184 still interact with first and second actuator latch contact features 160, 166, respectively, to latch and unlatch the actuator in a manner similar to that already described. The first major difference between the embodiment of FIG. 6 and that of FIG. 5 is that the second latch body contact feature 184 is formed of the same piece of material as the remainder of the latch body 180. This is because the embodiment of FIG. 6 does not use a permanent magnet to apply the constant unlatching force, as did the previously discussed embodiments.

Instead of a constant magnetic force, a spring member 186 is molded or otherwise integrated with the latch body 180. This spring member 186 can be a steel leaf or whisker spring, or, alternatively, could be formed of the same material as the remainder of the latch body 180, such as a plastic or polymer resin. The spring member 186 is straight in its relaxed condition, and is thus shown under tension and bent in FIG. 6. The distal end of the spring member 186 bears against a contact feature which is integral to the housing base member 102. The tendency of the spring member 186 to straighten out tends to rotate the latch body 180 counter-clockwise from the latched position shown to the unlatched position. This embodiment eliminates the need to include a permanent magnet and to mold a magnetically permeable striker into the latch body, as was the case with the embodiment of FIGS. 2, 3, 4 and 5, thus reducing parts count and simplifying assembly.

Figure 7:
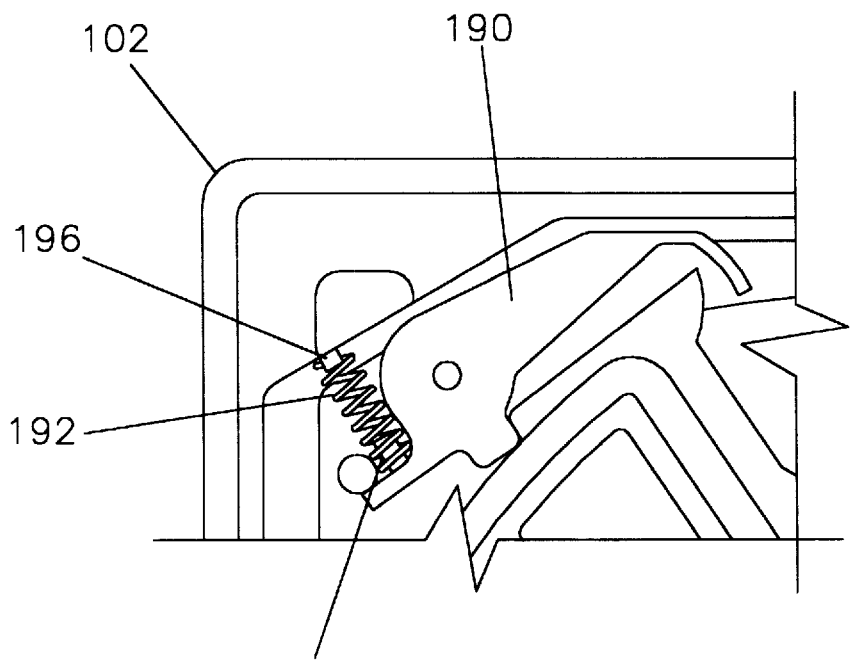
FIG. 7 is a detail view, similar to FIG. 5, showing a second alternative embodiment of the latching mechanism of the present invention.

A second alternative embodiment of the present invention is shown in FIG. 7. In the embodiment of FIG. 7, the constant force tending to rotate the latch body 190 counter-clockwise to its unlatched position is provided by a coil spring 192. Again, as in FIG. 6, the coil spring 192 is shown in a compressed condition and tends to lengthen when not constrained, pivoting the latch body 190 to its unlatched position. As shown in the figure, the latch body 190 includes a pin or spring mounting feature 194 which engages the inner diameter of the coil spring 192 in an interference fit, simplifying assembly, and the second end of the coil spring bears against a face 196 formed integrally with the disc drive housing base member 102. Since, once again, the permanent magnet (154 in FIGS. 2, 3, 4 and 5) has been eliminated, all of the features of the latch body 190 can be integrally formed of the same material.

A comparison of all embodiments shown reveals that several alternative component combinations could be used to apply the constant unlatching force to the latch body of the latching mechanism. For instance, a spring member could be fixedly attached to the housing base member and attached to or bear against a cooperative feature on the latch body to exert the unlatching force. Therefore, the scope of the present invention is not envisioned to be limited by the specific mechanism used to provide the unlatching force.

From the foregoing, it is apparent that the present invention is particularly well suited to achieve the objects and provide the benefits set forth hereinabove as well as others inherent therein. While particular embodiments of the invention have been described herein, modifications to the embodiments which fall within the envisioned scope of the invention may suggest themselves to one of skill in the art who reads this disclosure. Therefore, the scope of the invention should be considered to be limited only by the following claims.

What is claimed is:

1. In a disc drive including a disc drive housing and a plurality of recording heads carried on a rotary actuator for movement relative to a plurality of discs supported on a spindle motor and wherein the heads begin to fly above the discs when the spindle motor accelerates to a first speed and the heads cease to fly and come into contact with the discs when the spindle motor decelerates to a second speed, a latch mechanism for maintaining the actuator at a park position, the latch mechanism comprising:

first and second actuator contact features integral to and movable with the actuator, a pivot pin integral to the disc drive housing, a latch body, rotatable about the pivot pin to a latched position and an unlatched position, and including first and second latch body contact features, and means for applying a constant force to the latch body which acts to pivot the latch body to its unlatched position, wherein, when the actuator is moved to the park position, the first actuator contact feature contacts the first latch body contact feature, the movement of the actuator overcomes the constant force and rotates the latch body about the pivot pin to its latched position, in which position the second latch body contact feature contacts the second actuator contact feature and the actuator is constrained from movement by contact between the first and second actuator contact features and the first and second latch body contact features, and wherein a frictional force between the heads and discs is developed when the spindle motor decelerates below the second speed and the frictional force acts to prevent the constant force from rotating the latch body to its unlatched position.

2. A latch mechanism as claimed in claim 1 wherein the means for applying a constant force to the latch body which acts to pivot the latch body to its unlatched position comprises:

a permanent magnet mounted on the disc drive housing, and a magnetically permeable feature located on the latch body.

3. A latch mechanism as claimed in claim 1 wherein the means for applying a constant force to the latch body which acts to pivot the latch body to its unlatched position comprises:

a spring member integrally formed with the latch body and bearing against a fixedly located feature of the disc drive.

4. A latch mechanism as claimed in claim 1 wherein the means for applying a constant force to the latch body which acts to pivot the latch body to its unlatched position comprises:

a spring member attached to the latch body and bearing against a fixedly located feature of the disc drive.

* * * * *